E. W. CORNELL.
SAD IRON.
APPLICATION FILED NOV. 2, 1910.

1,040,281.

Patented Oct. 8, 1912.

UNITED STATES PATENT OFFICE.

EVAN W. CORNELL, OF ADRIAN, MICHIGAN.

SAD-IRON.

1,040,281.   Specification of Letters Patent.   Patented Oct. 8, 1912.

Application filed November 2, 1910. Serial No. 590,284.

*To all whom it may concern:*

Be it known that I, EVAN W. CORNELL, a citizen of the United States, residing at Adrian, in the county of Lenawee, State of Michigan, have invented certain new and useful Improvements in Sad-Irons; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to gas heated sad-irons, and consists in the construction and arrangement of parts hereinafter more fully set forth and pointed out particularly in the claims.

The objects of the invention are to produce a gas heated sad-iron having a combustion chamber whose bottom heating surface is radially corrugated and which is provided with corrugated sides.

A further object is to provide the combustion chamber with a ceiling composed of material non-conductive of heat.

A further object is to provide the combustion chamber with laterally inclined chimneys.

A further object is to provide a sad-iron with a burner having lateral radially disposed openings, and form said openings by means of spaced pins coöperating with the burner tube.

A further object is to provide a sad-iron with a mixing chamber insulated from the burner to obviate the liability of "back fire".

A further object is to provide a sad-iron burner with an adjustable telescopic tube for regulating the air.

A further object is to provide for insulating from the body of the iron the fitting carrying the gas orifice and to provide a forked regulating handle for adjusting the valve which controls the flow of gas through said orifice.

A further object is to provide a sad-iron with a handle with a flat bearing on top.

The above objects are attained by the structure illustrated in the accompanying drawings, in which:—

Figure 1:
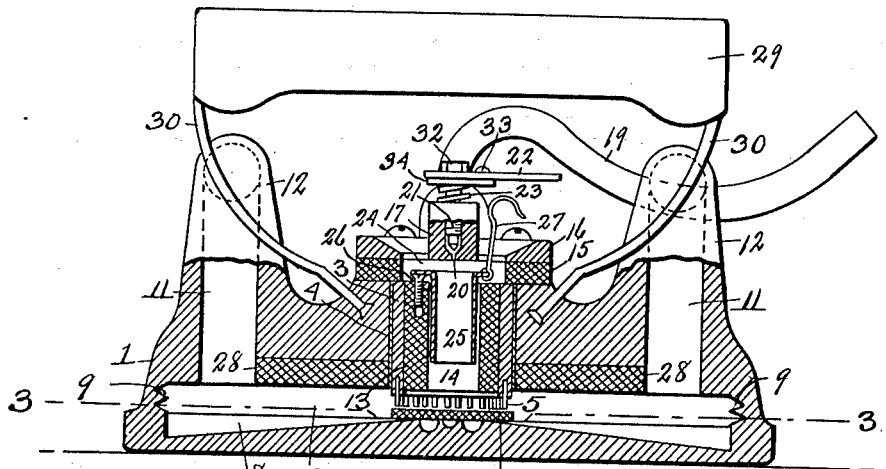
Figures 2, 4:
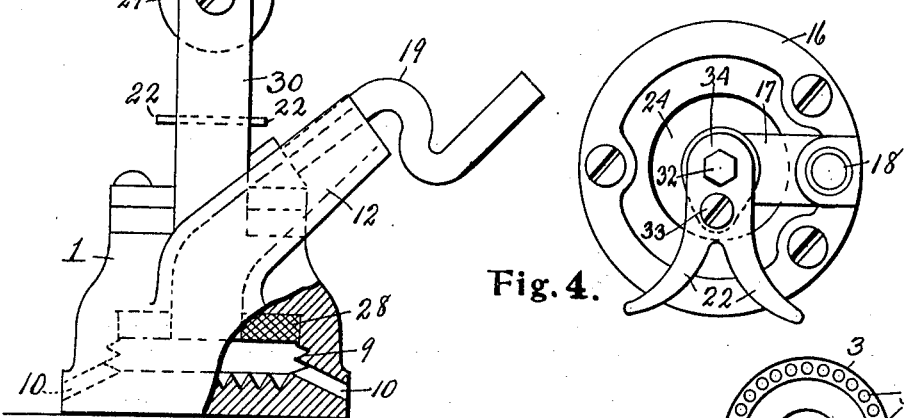
Figure 5:
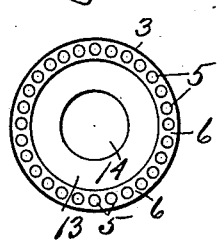
Figure 3:
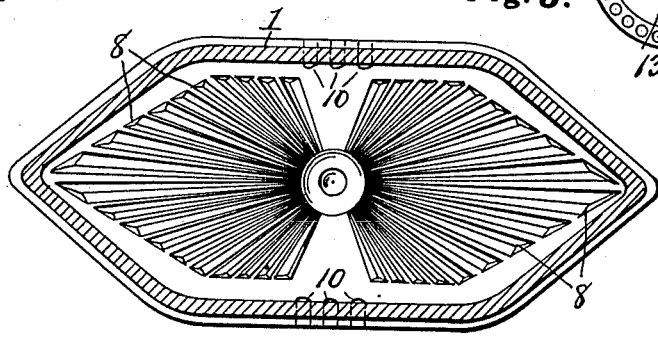

Figure 1 is a view partly in longitudinal section through a sad-iron involving my invention. Fig. 2 is an end elevation, parts being broken away. Fig. 3 is a horizontal section through the combustion chamber, as on line 3—3 of Fig. 1. Fig. 4 is a plan view of the parts carrying the fitting through which the gas orifice is formed and of the forked lever for actuating the controlling valve for said orifice. Fig. 5 is an inverted plan of the end of the burner.

Referring to the characters of reference, 1 designates the cast body of the sad-iron in which is formed a combustion chamber 2. Entering the combustion chamber centrally from the top is a burner tube 3 which depends therein and is insulated from the body of the iron by a non-conductive bushing 4 of asbestos or like material. Seated in the lower end of the burner tube are a plurality of pins 5 spaced from one another to form radially disposed flame orifices 6 whereby the heating flame is directed laterally from the lower end of the burner in all directions into the combustion chamber. Resting upon the bottom of the combustion chamber below the burner and in proximity to the pins 5, is a plate 7 of asbestos or other material which is a poor conductor of heat, whereby the bottom of the sad-iron is prevented from being excessively heated at that point.

In order to conduct the heat to the extremities of the combustion chamber and to more evenly distribute it over the bottom thereof, said bottom is provided with radial corrugations 8 which form channels between their prismatic sides that serve as avenues or conductors for the hot gases within the combustion chamber, whereby said gases are directed from the center of the chamber to the extremities thereof. The presence of said corrugations also serves to increase the heating surface of the iron. To provide the side walls of the combustion chamber with an increased heating surface, said walls are provided with circumferential corrugations 9, as shown in Figs. 1 and 2. Vent openings 10 are provided on opposite sides which communicate with the combustion chamber substantially on a plane with the bottom thereof.

The body of the iron at each end thereof is provided with vertical flue openings 11 leading from the combustion chamber with which the upwardly extending and laterally inclined chimneys 12 communicate.

Within the burner tube 3 is a bushing 13 made of asbestos or other material which is non-conductive of heat, within the central portion of which is formed the mixing chamber 14 of the burner. Mounted upon the top of the iron around the burner opening is a ring 15 of asbestos or other non-conductive material upon which is seated an annular fitting 16 carrying an inwardly extending bracket 17 having a gas feeding passage way therethrough, one end of which is connected at 18 (see Fig. 4) with a source of supply, such as a gas tube or hose 19, shown in Fig. 1, the opposite end of said bracket having the gas orifice 20 controlled by a threaded regulating valve 21. Mounted upon the upper end of the stem of the valve 21 is a forked operating lever 22 and interposed between the bracket 17 and the under side of said lever is a tension spring 23 which prevents said valve being turned too easily. This burner is of the Bunsen type, there being an open air space 24 between the mouth of the gas orifice and the top of the burner for the purpose of allowing the gas to mix with the air in such proportions as to render it combustible. For the purpose of varying the area of the air opening, or for closing it entirely, if desired, a tube 25 is inserted into the mixing chamber 14 provided with a flange at its upper end adapted to rest upon an adjusting screw 26. To enable said tube to be raised or lowered in said chamber, it is provided with a hooked link 27 which projects upwardly through the opening in the annular fitting 16. In lighting the burner, the tube 25 is drawn upwardly against the bottom of the bracket 17 so as to entirely cut off the air. This arrangement allows the gas to pass downwardly to the bottom of the burner and through the openings 6 between the pins 5 and to mix with the air in the combustion chamber so that upon igniting the mixture in the combustion chamber, the flame will not pass through said openings and ignite the gas within the mixing chamber. After the burner has been started the tube is lowered to the position shown in Fig. 1 to permit the gas and air to mix within the chamber 14, thereby insuring more perfect combustion, and causing a hot blue flame to burn in jets from the openings 6 between the pins 5.

In order to prevent the upper portion of the body of the iron becoming excessively heated and to confine the heat within the combustion chamber, the upper wall or ceiling of said chamber around the burner is formed of asbestos or other non-conductive material 28 which serves to insulate the combustion chamber from the upper portion of the body of the iron.

The handle 29 is supported at its ends by the curved members 30 which at their lower ends are embedded in the body of the iron, as shown in Fig. 1. The top of the handle is made flat, as shown at 31 in Fig. 2, to afford a better bearing for the hand of the operator.

By means of the forked controlling lever 22, the operator may readily control the volume of gas which passes through the gas orifice to increase or decrease the heating power of the burner in accordance with the varying conditions under which the iron is used.

To adjust the controlling valve 21, the stem of said valve is provided with a hexagon head 32 which fits a similarly shaped orifice in the lever 22. By removing the screw 33 which secures said lever to a plate 34 loosely mounted on the stem of said valve, and prevented by the head 32 from being withdrawn therefrom, the lever 22 may be lifted from said hexagon head and replaced thereon in a new position, thereby enabling such adjustment of the controlling valve to be effected as to increase or decrease the volume of gas which may be admitted to the burner.

Having thus fully set forth my invention, what I claim as new and desire to secure by Letters Patent, is:—

1. A flame heated sad-iron having an internal combustion chamber, a burner depending centrally therein, the bottom of said chamber being provided with corrugations surrounding and radiating from said burner, and a disk of insulating material interposed between said burner and the bottom of said chamber at the point of convergence of said corrugations.

2. A flame heated sad-iron comprising an internal combustion chamber, a burner located centrally therein, the bottom of said chamber being provided with radially disposed corrugations, and the side walls of said chamber being provided with circumferential corrugations.

3. A flame heated sad-iron comprising an internal combustion chamber, a centrally disposed burner therein, the bottom of said chamber being provided with radially disposed corrugations leading from said burner, the side walls of said chamber being provided with circumferential corrugations, and the ceiling of said chamber being composed of heat insulating material surrounding said burner.

4. A flame heated sad-iron having an internal combustion chamber in the body thereof, the ceiling and bottom of said chamber being substantially parallel, a burner within said chamber depending through the ceiling, and a flat sheet of heat insulating material on the ceiling of said chamber surrounding and embracing said burner in proximity to the flame orifices therein.

5. A sad-iron having a combustion chamber therein, a top having a burner opening communicating with said combustion chamber, a fitting mounted on said top over said opening having a gas orifice formed therein and also having an air opening around said gas orifice, and a heat insulating element interposed between the top of the iron and said fitting, said insulating element wholly supporting and separating said fitting from the body of the iron.

6. A sad-iron having a combustion chamber, a burner located therein comprising a tubular member, and a plurality of spaced pins coöperating with said tubular member to form radially disposed flame spaces.

7. A sad iron having a combustion chamber, a burner tube extending vertically through the wall of the iron into communication with said chamber, a burner in the combustion chamber at the lower end of said tube, a sleeve of non-conductive material embracing the burner tube and interposed between said tube and the wall of the iron, a bushing of non-conductive material located within the burner tube and co-extensive in length therewith, and a tube depending within said bushing and vertically adjustable therein.

8. A sad iron having a combustion chamber, a burner tube extending vertically through the wall of the iron into communication with said chamber, a burner in the combustion chamber at the lower end of said tube, a bushing of non-conductive material located within the burner tube and co-extensive in length therewith, and an air regulating tube vertically adjustable within said bushing.

In testimony whereof, I sign this specification in the presence of two witnesses.

EVAN W. CORNELL.

Witnesses:
EDGAR HAROLEY,
FRANK L. HOUGH.

---

Copies of this patent may be obtained for five cents each, by addressing the "Commissioner of Patents, Washington, D. C."